United States Patent
Momose et al.

(10) Patent No.: US 7,502,527 B2
(45) Date of Patent: Mar. 10, 2009

(54) IMAGE PROCESSING APPARATUS, IMAGE PROCESSING METHOD, AND IMAGE PROCESSING PROGRAM PRODUCT

(75) Inventors: Hiroaki Momose, Suwa (JP); Tatsuya Kitazawa, Suwa (JP); Hidetake Nishizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 669 days.

(21) Appl. No.: 10/879,507

(22) Filed: Jun. 30, 2004

(65) Prior Publication Data
US 2005/0018926 A1    Jan. 27, 2005

(30) Foreign Application Priority Data
Jun. 30, 2003    (JP) .............................. 2003-186928
May 14, 2004    (JP) .............................. 2004-144581

(51) Int. Cl.
*G06K 9/36*    (2006.01)
(52) U.S. Cl. ...................................... 382/284; 358/1.18
(58) Field of Classification Search ................. 382/284, 382/276–308
See application file for complete search history.

(56) References Cited
U.S. PATENT DOCUMENTS

| | | | |
|---|---|---|---|
| 4,835,532 A * | 5/1989 | Fant ............................ 345/611 |
| 5,022,085 A * | 6/1991 | Cok ............................. 382/284 |
| 5,185,808 A * | 2/1993 | Cok ............................. 382/284 |
| 5,187,754 A * | 2/1993 | Currin et al. ................. 382/284 |
| 5,325,449 A * | 6/1994 | Burt et al. .................... 382/240 |
| 6,075,905 A * | 6/2000 | Herman et al. ............... 382/284 |
| 6,222,637 B1 * | 4/2001 | Ito et al. ..................... 358/1.18 |
| 6,525,836 B1 * | 2/2003 | Ito et al. ..................... 358/1.18 |
| 2001/0046330 A1 * | 11/2001 | Shaffer et al. ............... 382/284 |

FOREIGN PATENT DOCUMENTS

| | | |
|---|---|---|
| JP | 08-77337 | 3/1996 |
| JP | 2001-045346 A | 2/2001 |
| WO | 9624909 | 8/1996 |

\* cited by examiner

*Primary Examiner*—Tsung-Yin Tsai
(74) *Attorney, Agent, or Firm*—Sughrue Mion, PLLC

(57) ABSTRACT

An image processing apparatus has a mode selecting unit for selecting one of plural image selection modes having different objects. There is also an image selecting unit for selecting a set of composite image reproduction data and items of component image data from a group of the sets of the composite image reproduction data formed of items of the component image data or from a group of the items of the component image data. The selection is performed in accordance with the image selection mode selected by the mode selecting unit. The group of the sets of the composite image reproduction data, and the group of the items of the component image data, are objects for selection. A processing unit executes a process for the set of the composite image reproduction data or the item of the component image data selected by the image selecting unit.

2 Claims, 14 Drawing Sheets

```
SCRIPT
  PRINT SIZE: POSTCARD
  ORIENTATION OF PRINTING PAPER: PORTRAIT
  COORDINATES OF PRINT OBJECT
                    IMAGE FRAME: (x1, y1), (x2, y2)
  ROTATION OF PRINT OBJECT IMAGE:
      ROTATE AT AN ANGLE OF 90 DEGREES COUNTERCLOCKWISE
  COORDINATES OF BACKGROUND
                    IMAGE FRAME: (x3, y3), (x4, y4)
  BACKGROUND IMAGE: birthday.eff
  α-CHANNEL: alpha.efa
```

FIG. 4

IMAGE PROCESSING APPARATUS, IMAGE PROCESSING METHOD, AND IMAGE PROCESSING PROGRAM PRODUCT

BACKGROUND OF THE INVENTION

CROSS-REFERENCE TO RELATED APPLICATIONS

The disclosure of Japanese Patent Application No.JP2003-186928 filed on Jun. 30, 2003 and Japanese Patent Application No.JP2004-144581 filed on May 14, 2004 including the specification, drawings and abstract is incorporated herein by reference in its entirety.

1. Field of the Invention

The present invention relates to an image processing apparatus, an image processing method, and an image processing program product.

2. Description of the Related Art

An image processing apparatus is known in which an image taken by a digital camera or read by an image scanner is combined with another image to reproduce a single composite image (for example, see Japan Domestic Re-publication of PCT Application 96-24909, hereafter referred to Patent Document 1). The image processing apparatus described in Patent Document 1 generates and reproduces the composite image, and then stores the generated composite image as a single composite image data.

Furthermore, an image processing apparatus is also known in which an image is similarly combined with another image and a single composite image is reproduced (for example, see JP-A-8-77337, hereafter referred to as Patent Document 2). The image processing apparatus described in Patent Document 2 displays a list of stored background images to accept the selection of one of the background images when a background key is operated, while it displays a list of foreground images to accept the selection of one of the foreground images when a foreground key is operated. When it accepts the selection, it combines the selected foreground image with the selected background image for display. In the image processing apparatus described in Patent Document 2, the background key is operated in a state that a composite image is shown, and then only the background image can be changed as well with no influence upon the foreground image.

When the image processing apparatus described in Patent Document 1 or Patent Document 2 is used, for example, a foreground image of a person having a birthday can be combined with a part of the area of a background image of an illustration relating to the birthday, and a foreground image representing a message to celebrate the birthday can be combined with another area for display.

In the case where the image processing apparatus combines such a plurality of component images selected by a user and reproduces a composite image, the reproduced composite image is stored in the image processing apparatus, and thus efforts to again select the component images are eliminated when the user wants to reproduce the composite image later. In this case, if the image processing apparatus does not store the single composite image data that has been generated by combining a plurality of component images but stores a plurality of component images in association with each other, the user can also use a part of the component images for another purpose later. More specifically, for example, suppose the user distributes to an acquaintance a plurality of items of component image data in association with each other. In this case, the acquaintance who received it can reproduce a composite image (from the items of the component image data) and, in addition to this, the acquaintance can also use the items of the component image data (forming a composite image reproduction data) for a purpose other than the reproduction of the composite image. For example, the image processing apparatus may combine, for display only, a component image that another person has taken with a component image representing a birthday-related illustration, and the image processing apparatus may also print just the component image that was taken.

One problem with the foregoing is that, when a user sees a reproduced composite image and uses the items of the component image data forming the composite image for another purpose, the user needs to separately activate a program for operating on files to manipulate the component image data. In such a situation, it is difficult to use the component image data for another purpose. The user may not know the file name of the component image data, and may not remember a folder having the file stored therein.

SUMMARY OF THE INVENTION

The invention has been made in view of the foregoing and other problems, and an object of the invention is to provide an image processing apparatus, an image processing method, and an image processing program product, in which a user can easily select, as processing objects, sets of composite image reproduction data or items of component image data forming the items of the composite image reproduction data.

For solving the above problems, an image processing apparatus may include: a mode selecting unit for selecting one of a plurality of image selection modes; wherein objects for selection are different each other in the image selection mode; an image selecting unit for selecting, in accordance with the image selection mode selected by the mode selecting unit, one of a plurality of sets of composite image reproduction data and a plurality of items of component image data, wherein the sets of the composite image reproduction data are formed of a plurality of the items of the component image data, wherein the sets of the composite image reproduction data and the items of the component image data are objects for selection that can be selected by the selected image selection mode; and a processing unit for executing a predetermined process for one of the set of the composite image reproduction data and the item of the component image data selected by the image selecting unit.

For example, when there are the image selection modes such that the sets of the composite image reproduction data are selection objects and that the items of the component image data forming the sets of the composite image reproduction data are selection objects, the user can select not only the sets of the composite image reproduction data but also the items of the component image data forming the sets of the composite image reproduction data as processing objects. Moreover, for example, when there is a plurality of the image selection modes such that the items of the component image data having attributes different from each other are selection objects, the user can easily select the items of the component image data having a particular attribute from the items of the component image data forming the sets of the composite image reproduction data as processing objects. In this manner, since the image processing apparatus has a plurality of the image selection modes with different objects for selection, the user can easily select a target set of the composite image reproduction data or a target item of the component image data from the sets of the composite image reproduction data or the items of the component image data forming the sets of the composite image reproduction data in the image selection mode in accordance with processing objects.

The set of the composite image reproduction data may be formed of a plurality of the items of the component image data having different attributes, and the mode selecting unit may select one of: a first image selection mode wherein the objects for selection are items of the component image data having a given attribute, and a second image selection mode wherein the objects for selection are the items of the component image data having an attribute different from that of the items of the component image data selected by the first image selection mode.

According to an embodiment of the image processing apparatus, when the user selects a particular item of component image data from items of component image data having a certain attribute, only the items of the component image data having the pertinent attribute become the objects for selection in the image selection mode in accordance with the attribute of the item of the component image data to be selected, and thus the user can easily select the data.

The mode selecting unit may select one of: a third image selection mode wherein the objects for selection are the sets of the composite image reproduction data, and a fourth image selection mode wherein the objects for selection are the items of the component image data.

According to an embodiment of the image processing apparatus, the user can select the sets of the composite image reproduction data as processing objects, and can separately select the items of the component image data forming the sets of the composite image reproduction data as processing objects.

In the fourth image selection mode, the selection objects may be a group of the items of the component image data forming the set of the composite image reproduction data selected by the third image selection mode, and can be selected by the image selecting unit. According to the image processing apparatus according to such an embodiment, the flow of the operations is first to select one of the sets of the composite image reproduction data, and then select the items of the component image data forming the selected set of the composite image reproduction data. More specifically, since the selection proceeds hierarchically from a large unit to a small unit, the user easily understands the operations.

The mode selecting unit may accept a designation of the image selection mode by a user, and selects the specified image selection mode. According to the image processing apparatus according to such an embodiment, the user can freely specify which image selection mode is selected.

The image selecting unit may show composite image designation information for designating the set of the composite image reproduction data on a screen as selection objects for selecting the sets of the composite image reproduction data. According to such an image processing apparatus, since the composite image designation information is shown on the screen, the user can easily select the sets of the composite image reproduction data as the user sees the screen.

The composite image designation information may comprise a thumbnail image, representing an overview of a composite image, reproduced based on the set of the composite image reproduction data. According to such an image processing apparatus, since the thumbnail images representing the overview of the composite images are shown, the user can further easily select the sets of the composite image reproduction data.

When one of the sets of the composite image reproduction data is selected by the image selecting unit, the processing unit may execute a process of showing the composite image in higher resolution than the thumbnail image, based on the selected set of the composite image reproduction data. According to the image processing apparatus according to this embodiment, the user can see the composite image in high resolution.

When one of the sets of the composite image reproduction data is selected by the image selecting unit, the processing unit may execute a process of printing a composite image based on the selected set of the composite image reproduction data. According to such an image processing apparatus, the user can print the composite image.

The image selecting unit may show component image designation information, for designating the items of the component image data on a screen as selection objects, wherein the selection objects are for selecting the items of the component image data. According to such an image processing apparatus, since the component image designation information is shown on the screen, the user can easily select the items of the component image data as the user sees the screen.

The component image designation information may comprise an thumbnail image representing an overview of a component image reproduced based on the item of the component image data. According to such an image processing apparatus, since the thumbnail images representing the overview of the component images are shown, the user can further easily select the items of the component image data.

When one of the items of the component image data is selected by the image selecting unit, the processing unit may accept a designation of operations for the selected item of the component image data, and executes the specified operation for the selected item of the component image data. According to such an image processing apparatus, the user specifies the operation to copy a component image, for example, and then the user can copy and use an item of the component image data for another purpose.

When one of the items of the component image data is selected by the image selecting unit, the processing unit may a process of showing the component image in higher resolution than the thumbnail image, based on the selected item of the component image data. According to such an image processing apparatus, the user can see the component image in high resolution.

One or more items of the component image data, forming a single set of the composite image reproduction data may be stored in a single file. According to such an image processing apparatus, since one or more items of the component image data are stored in a single file, the portability of the composite image reproduction data is enhanced.

For solving the above-mentioned and other problems, an image processing method may include a mode selection step of selecting one of a plurality of image selection modes having different objects for selection; an image selection step of selecting, in accordance with the image selection mode selected by the mode selecting unit, one of a plurality of sets of composite image reproduction data and a plurality of items of component image data, wherein the sets of the composite image reproduction data are formed of a plurality of the items of the component image data, wherein the sets of the composite image reproduction data and the items of the component image data are objects for selection that can be selected by the selected image selection mode; and a processing step of executing a predetermined process for one of the selected set of the composite image reproduction data and the selected item of the component image data.

For solving the above-mentioned and other problems, an image processing program product may include instructions defining program product units for allowing a computer to perform various functions, including: a mode selecting unit adapted to select one of a plurality of image selection modes having different objects for selection; an image selecting unit adapted to select, in accordance with the image selection mode selected by the mode selecting unit one of a plurality of sets of composite image reproduction data and a plurality of items of component image data, wherein the sets of the composite image reproduction data are formed of a plurality of the items of the component image data, wherein the sets of the composite image reproduction data and the items of the component image data are objects for selection that can be selected by the selected image selection mode; and a processing unit, adapted to execute a predetermined process for one of the set of the composite image reproduction data and the item of the component image data selected by the image selecting unit.

In addition, each function of a plurality of the units provided according to the foregoing embodiments of the invention may be implemented by hardware resources such that the functions are specified by the hardware configuration itself, or hardware resources such that the functions are specified by software programs, or combinations thereof. Furthermore, the various functions of the different units described are not limited to being implemented by resources physically independent of one another.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings:

FIG. 4 is a schematic diagram illustrating a file in the first embodiment according to the invention;

DETAILED DESCRIPTION OF THE INVENTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

First Embodiment

A first embodiment is an image processing apparatus having an image selection mode such that a group of sets of composite image reproduction data, formed of a plurality of items of component image data, constitute selection objects, and another image selection mode such that individual groups of items of component image data, forming the sets of the composite image reproduction data, constitute selection objects.

Figure 2:
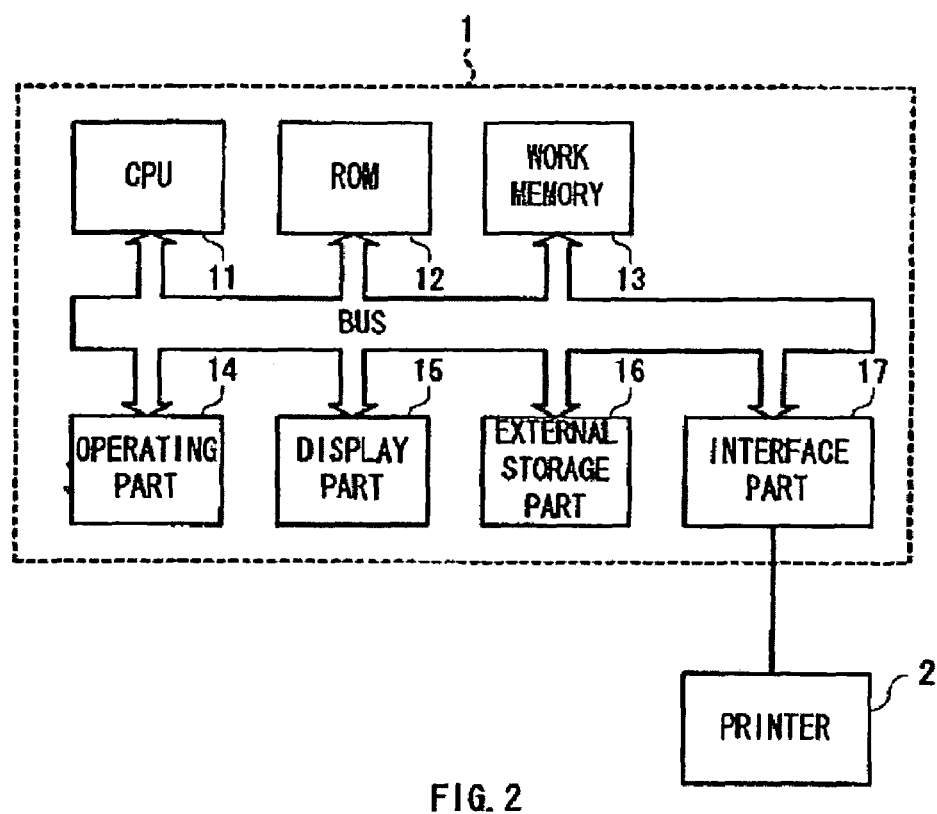
FIG. 2 is a block diagram illustrating the first embodiment according to the invention.

FIG. 2 is a block diagram illustrating the hardware configuration of an image processing apparatus in a first exemplary embodiment of the invention. The image processing apparatus is configured of a personal computer (PC) 1 and a printer 2. The PC 1 has a CPU 11, a ROM 12, a work memory 13, an operating part 14, a display part 15, an external storage part 16, and an interface part 17, and they are connected to each other by a bus 18. The CPU 11 executes programs stored in the ROM 12 and the external storage part 16 to control the entire PC 1. Furthermore, the CPU 11 also functions as a component of a mode selecting unit, an image selecting unit, and a processing unit, by executing an image processing program, which will be described later. The ROM 12 is a memory that stores various programs and data beforehand. The work memory 13 is a memory that temporarily stores various programs and data. The operating part 14 is formed of a mouse and a keyboard, which functions as the mode selecting unit, the image selecting unit, and the processing unit. The display part 15 is formed of a CRT or LCD (Liquid Crystal Display) or the like. The display part 15 functions as another component of the mode selecting unit, the image selecting unit, and the processing unit, and it shows various screens for accepting operations such as selecting the image selection modes and image designation information, designating operations, and instructing operations. Moreover, the display part 15, in its function as a component of the processing unit, shows a generated composite image based on a set of composite image reproduction data and component images. The external storage part 16 as the storage unit is formed of a hard disk and a hard disk controller, which stores an operating system (OS), image processing programs, and one or more sets of composite image reproduction data formed of a plurality of items of component image data in association with each other. These programs and various data may be stored in the external storage part 16 by being down-loaded from a given server through networks, and by being read from a computer readable storage medium such as a removable memory. The interface part 17 is formed in conformity with communications standards such as USB and Bluetooth, and is joined to the printer 2. The printer 2 prints a composite image or component image on printing paper based on print data outputted from the PC 1, in accordance with inkjet or laser printing, for example.

In addition, in the embodiment, an example will be described in which the PC 1 to be the image processing apparatus has the external storage part 16 as the storage unit, but the storage unit is not an essential component for the image processing apparatus according to this embodiment of the invention. For example, it is acceptable that the PC 1 utilize an external storage device connected to a network as the storage unit through the network. In this case, the external storage device utilized through the network does not configure the PC 1. Furthermore, in this case, a network interface needs to be provided for the PC 1 as a part of the image selecting unit and the processing unit in order to select the composite image reproduction data and the component image data stored in the external storage device that is utilized through the network and to read and process the selected data. Moreover, it is acceptable if the storage unit is a removable memory. In this case, a device for reading data from the removable memory needs to be provided for the PC 1.

Next, the composite image reproduction data will be described.

Figure 3:
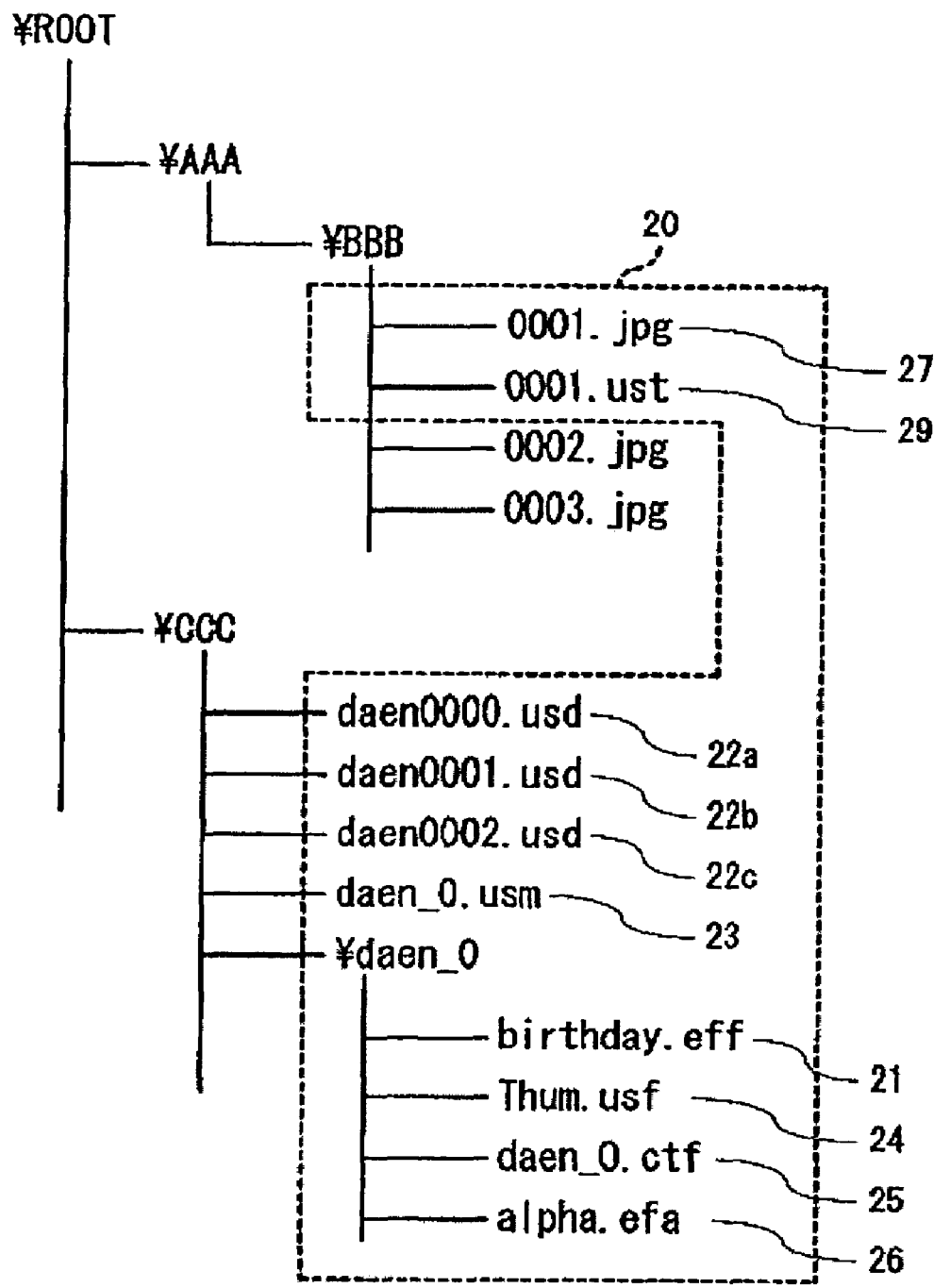
FIG. 3 is a schematic diagram illustrating a set of composite image reproduction data in the first embodiment according to the invention.

FIG. 3 is a schematic diagram illustrating the composite image reproduction data. A set of composite image reproduction data 20 of the embodiment is formed of a background image file 21 as component image data, a print object image file 27 as component image data, layout definition files 22a, 22b and 22c, an index file 23, a drawing device thumbnail 24, a camera thumbnail 25, an α-channel 26, and an association file 29. As shown in the drawing, the composite image reproduction data is distributed and stored in a plurality of folders; a plurality of files forming the composite image reproduction data is not stored in the same folder. First, the background image file and the print object image file will be described.

The file 21 having the extension of '.eff' is the background image file as the component image data. A background image represented by the background image file is an image that is to be combined as the background or foreground of a print object image represented by the print object image file 27. Furthermore, in the embodiment, images used for the background and images used for the foreground are collectively referred to as background images. The background image file may be a JPEG format file of four channels. The general JPEG format files are formed of three channels, Y (brightness component), Cb (blue component), and Cr (red component), but a background image file further has an α-channel in addition to them. The α-channel is a channel for storing data (α-channel data) defined at every pixel indicating which pixels of a background image are to be reflected to a composite image when the background image is superimposed and combined. The use of the α-channel allows the background image to be combined in any desired shape, thus enhancing layout flexibility. The exemplary set of the composite image reproduction data 20 shown in the drawing has a single background image file 21 forming the composite image reproduction data 20, but it is possible to include a plurality of background image files in a set of the composite image reproduction data.

The file 27 having the extension of '.jpg' is the print object image file, and constitutes a kind of component image data. The print object image file is formed of three channels, similar to the general JPEG format file, and different from the background image file mentioned above. For example, since many digital cameras can create three-channel JPEG format files, a user can take an image of the JPEG format by a digital camera to create a print object image file. The user associates a desired print object image file with a background image file as one item of a set of composite image reproduction data, and thus can combine the same background image file with the desired print object image file. In addition, this association will be described later. The exemplary set of the composite image reproduction data 20 shown in the drawing has a single print object image file 27 forming the composite image reproduction data 20, but it is possible to include a plurality of print object image files in a set of the composite image reproduction data. Moreover, it is acceptable if the file format of the print object image file is a format other than JPEG such as, for example, BMP, TIFF, and PNG formats.

In addition, in the embodiment, the component image data forming the composite image reproduction data will be described as the background image file and the print object image file are examples, but it is likewise acceptable if only one of them is included in a set of the composite image reproduction data as the component image data. Moreover, in the description below, the background image file and the print object image file are collectively referred to as the component image files.

Next, the layout definition file will be described. The files 22a, 22b and 22c having the extension of '.usd' are the layout definition files. The layout definition file is a file that defines how the background image represented by the background image file 21 and the print object image represented by the print object image file 27 are arranged to reproduce a composite image, that is, the file that defines the layout of the component image files. Furthermore, the layout definition file is also a file that associates one or more of the component image files with each other. A set of the composite image reproduction data 20 can store a plurality of the layout definition files that define layouts having different paper sizes and similar relationships with each other.

Figure 5A:
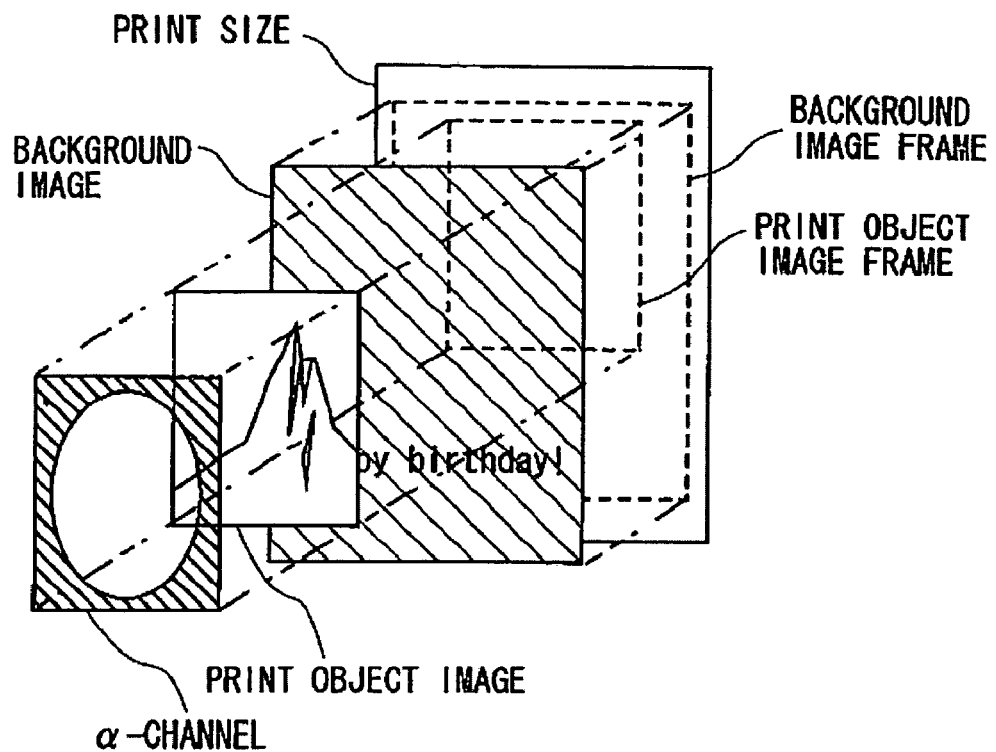
FIG. 5A is a schematic diagram illustrating the reproduction of a composite image in the first embodiment according to the invention.
Figure 5B:
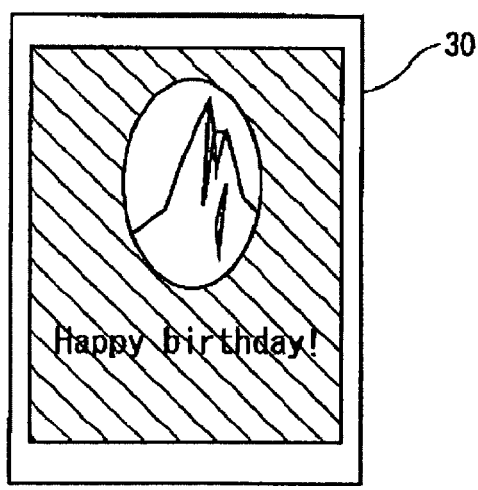
FIG. 5B is a schematic diagram illustrating the composite image.

FIG. 4 is a schematic diagram illustrating the content of the layout definition file. FIG. 5A is a schematic diagram for describing the reproduction of a composite image, and FIG. 5B is a plan view illustrating a postcard that the composite image is reproduced by printing. The layout definition file defines information for arranging a print object image on printing paper, information for rotating and arranging the print object image on printing paper, and/or information for scaling up or down the print object image by scripts. More specifically, for example, the following information is defined: information for defining the paper size of printing paper (for example, 'postcard') and the orientation of printing paper (for example, 'portrait'), information for defining a frame (print object image frame) where a print object image is arranged (for example, the upper left coordinates '(x1, y1)' of the frame and the lower right coordinates '(x2, y2)' of the frame), information for defining the rotation when the print object image is arranged in the frame (for example, 'rotate at an angle of 90 degrees counterclockwise'), information for designating a background image file representing a background image to be combined with the print object image (for example, 'birthday.eff' to be the file name of the background image file), information for defining a frame where the background image is arranged (for example, the upper left coordinates '(x3, y3)' of the frame and the lower right coordinates '(x4, y4)' of the frame), and information for designating the α-channel applied to the print object image file. Since information for designating the background image file for reproducing a single composite image is defined to the layout definition file, the layout definition file is to associate the background image file for reproducing a single composite image.

Next, the index file 23, the drawing device thumbnail 24, the camera thumbnail 25, and the α-channel 26 will be described. These files are not always necessary as the files forming a set of the composite image reproduction data.

The file 23 having the extension of '.usm' is the index file. As described before, a set of the composite image reproduction data 20 can include a plurality of the layout definition files at each paper size. The index information about the plurality of the layout definition files is described in the index file. More specifically, for example, the number of the layout definition files, the file names of the layout definition files, and the size of the printing paper associated with each of the layout definition files may be described. In reproducing a composite image, one set of the composite image reproduction data is selected, and, in addition to this, the size of the printing paper is specified. The index file is a file used in printing in this manner. The image processing program of the first embodiment interprets the index file to specify the layout definition file corresponding to the printing paper size, and thus allows printing in the layout in accordance with the printing paper size.

The file 24 having the extension of '.usf' is the drawing device thumbnail. The drawing device thumbnail is a file for showing a thumbnail image representing the overview of the composite image reproduced based on a set of the composite image reproduction data 20 on the display part 15. The thumbnail image is an image such that the composite image actually combined is scaled down.

The file 25 having the extension of '.ctf' is the camera thumbnail. The camera thumbnail is a thumbnail image file for showing the overview of the area other than the print object image of the composite image reproduced based on a set of the composite image reproduction data 20 on a display device provided for the digital still camera. When the overview of the area other than the print object image of the composite image is shown in taking the print object image, the user can easily determine the composition of the print object image to be combined with the background image.

The file 26 having the extension of '.efa' is the α-channel applied to the print object image. The α-channel is a one-channel JPEG format file, and α-channel data is stored in one channel thereof. The use of the α-channel file 26 allows the print object image to be combined in any desired shape, for example, a heart and an ellipse, and thus the flexibility of layout can be enhanced.

The file 29 having the extension of '.ust' is the association file for associating a plurality of files as a single set of the composite image reproduction data. More specifically, the print object image file '0001.jpg' is associated with the association file '0001.ust' by the file names. For example, the file name of 'daen_0.usm' is described in the association file '0001.ust'. That is, the association file '0001.ust' is associated with the index file 'daen_0.usm' by the file names described in the association file. The index file 'daen_0.usm' is associated with a plurality of layout definition files by the file names of the layout definition files described in the index file. Accordingly, all the component image files are associated with each other. Moreover, the α-channel file 'alpha.efa', the drawing device thumbnail 'Thum.usf', and the camera thumbnail 'daen_0.ctf' are stored in the folder 'daen_0' having the same name as the index file 'daen_0.usm', and thus they are associated with the index file. In this manner, a plurality of files is associated with each other as a single set of the composite image reproduction data. Furthermore, in the present embodiment, the print object image file '0001.jpg' to be the component image data is associated with the background image file to be the component image data through the association file '0001.ust', but it is also acceptable if the information for designating the print object image file be defined in the layout definition file for association. In this case, the association file is unnecessary.

Figure 1:
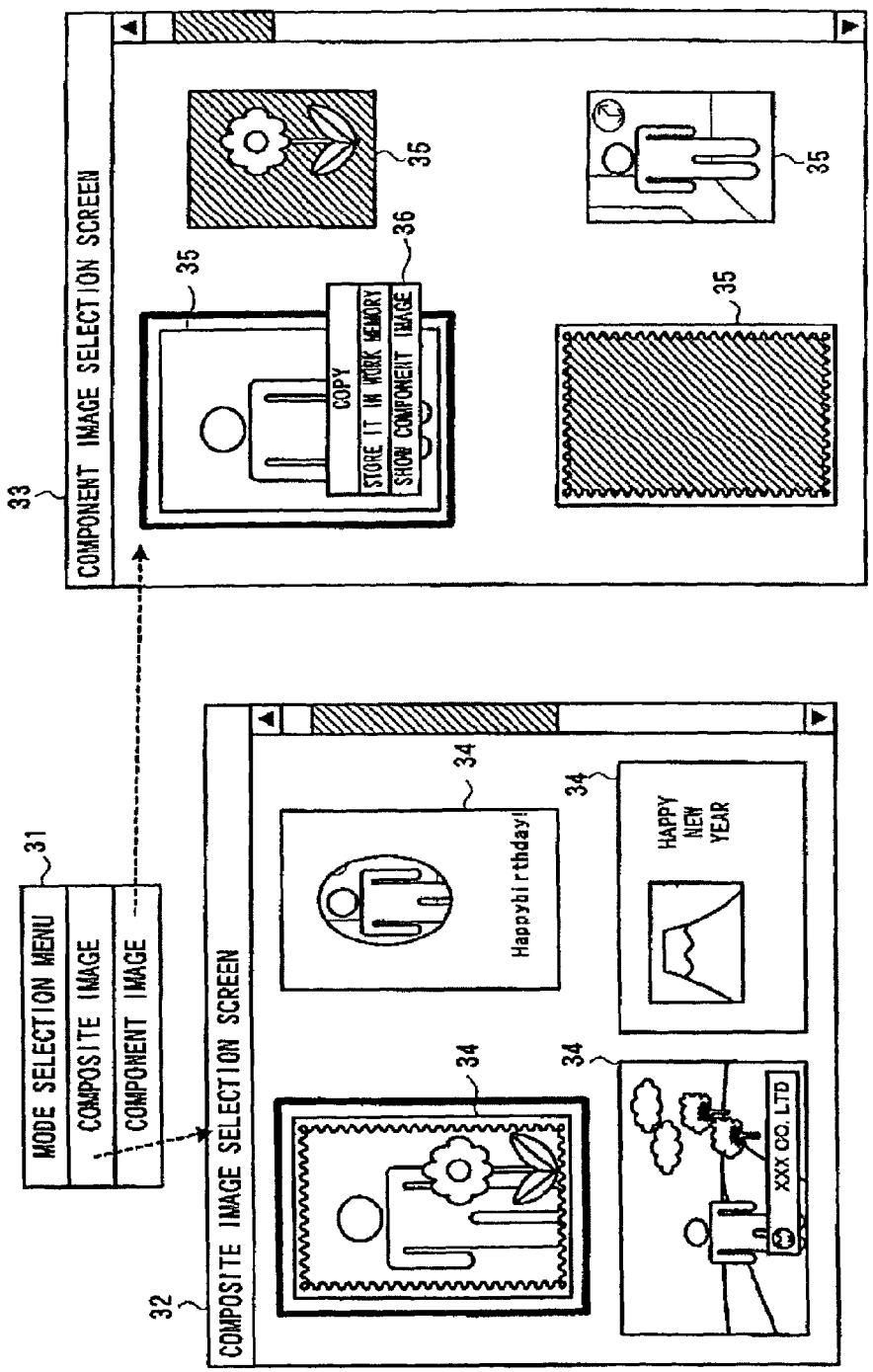
FIG. 1 is a schematic diagram illustrating screens in a first embodiment according to the invention.

Next, the image processing program will be described. FIG. 1 is a schematic diagram illustrating screens shown by the image processing program. A mode selection menu 31, shown on a screen, is for accepting the selection of an image selection mode such that sets of composite image reproduction data are objects for selection (hereinafter, they are called 'selection objects'), and another image selection mode in which component image files forming the sets of the composite image reproduction data constitute the selection objects. When 'Composite Image' is selected using the mode selection menu 31, a third image selection mode is entered in which is shown a composite image selection screen 32. When 'Component Image' is selected using the mode selection menu 31, a fourth image selection mode is entered in which is shown a component image selection screen 33. Composite image designation information is shown on the composite image selection screen 32 to select only the sets of the composite image reproduction data. Moreover, component image designation information is shown on the component image selection screen 33 to select only the component image files. Therefore, the objects for selection are varied in the third image selection mode and the fourth image selection mode.

The composite image selection screen 32 is a screen for accepting the selection of the sets of the composite image reproduction data. On the composite image selection screen 32, the composite image designation information for designating the sets of the composite image reproduction data is shown as selection objects regarding all the sets of the composite image reproduction data which are directly or subordinately stored in a predetermined folder of the external storage part 16. In the first embodiment, thumbnail images 34 represented by the drawing device thumbnails 24 associated with the sets of the composite image reproduction data are shown all at once as the composite image designation information. When the thumbnail images 34 are shown, the user can know the overview of composite images, and can easily select the sets of the composite image reproduction data. When one of the thumbnail images 34 is selected, a set of the composite image reproduction data is uniquely specified such that the drawing device thumbnail 24 representing the selected thumbnail image 34 is one of the items of the component image data. For example, in the case where each of the shown thumbnail images 34 is associated with the file name of the association file, when one of the thumbnails images 34 is selected, a set of the composite image reproduction data is uniquely specified from the selected thumbnail image 34. In addition, when the drawing device thumbnail is not stored in a set of the composite image reproduction data, it is acceptable that the PC 1 shows the file names of the association files all at once as the composite image designation information. The user can hold a mouse cursor over the thumbnail image 34 and double-click it to select the composite image designation information. When the user selects a piece of the composite image designation information, a composite image is generated based on a set of the composite image reproduction data specified by the selected piece of the composite image designation information, and the generated composite image is printed by the printer 2, or shown on the display part 15 by the thumbnail image in high resolution.

The component image selection screen 33 is a screen for accepting the selection of the component image files and the designation of operations for the selected component image file. On the component image selection screen 33, component image designation information, for designating individual component image files, is shown as selection objects regarding all the component image files which are directly or subordinately stored in a predetermined folder of the external storage part 16 and which form particular sets of composite image reproduction data. In the first embodiment, the component images represented by the component image files are scaled down and shown all at once as the component image designation information. Thumbnail images 35 in the drawing depict scaled-down component images. When the thumbnail images 35 are shown, the user can see the overview of the component images, and can easily select the component image files. In a manner similar to that described with respect to the thumbnail images 34, the thumbnail images 35 are shown so that the component image files can be uniquely specified. Moreover, when the overview of the component images can be understood by reading only the file names, it is acceptable if the file names of the component image files be shown all at once. As shown in the drawing figure, only the thumbnail images 35 represented by the component image files are shown on the component image selection screen 33, and information for selecting the files such as the layout definition files and the index file is not shown. Therefore, according to the image processing program of the first embodiment, only the component image files can be selected easily. The user can, for example, hold a mouse cursor over the thumbnail image 35 and click the right button of a mouse to select a piece of the component image designation information. When the right button is clicked, a pop-up menu 36 is shown. The user may select operations such as [Copy], [Store it in Work Memory], and [Show Component Image] in the shown pop-up menu 36, and can specify particular operations for the component image file specified by the selected thumbnail image 35. It is possible to output the component image file to another program through the work memory 13 by dragging and dropping the thumbnail image with the mouse.

Figure 6:
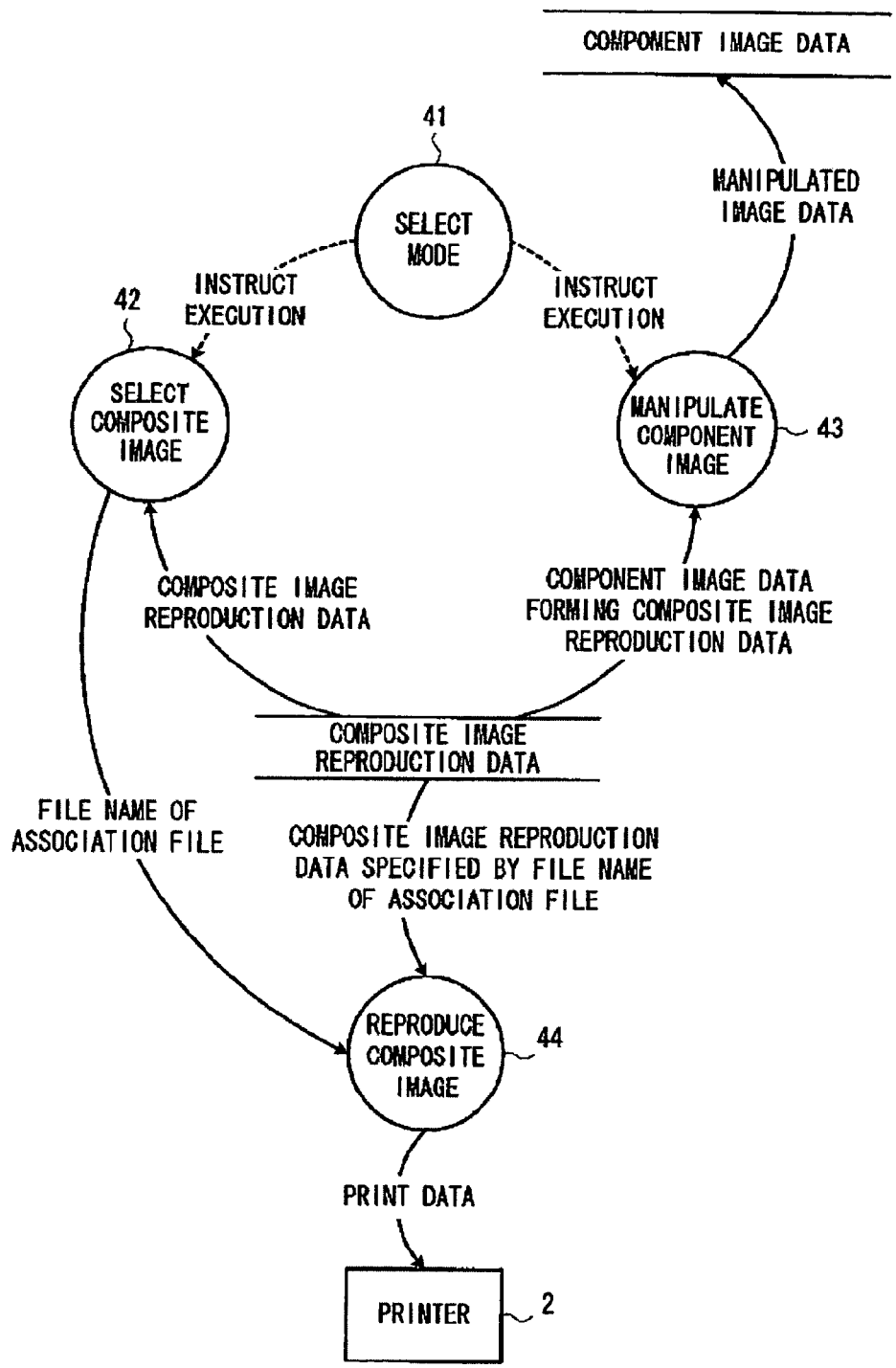
FIG. 6 is a data flow chart illustrating the first embodiment according to the invention.

FIG. 6 is data flow chart illustrating the image processing program. As shown in the drawing, the image processing program allows the PC 1 to execute a mode selection process 41, a composite image selection process 42, a component image manipulation process 43, and a composite image reproduction process 44.

The mode selection process 41 is a process of showing the mode selection menu 31 and accepting the designation of the image selection modes. When 'Composite Image' is specified, the mode selection process 41 selects the third image selection mode, and instructs the composite image selection process 42 to execute it. When 'Component Image' is specified, the mode selection process 41 selects the fourth image selection mode, and instructs the component image manipulation process 43 to execute it.

The composite image selection process 42 is a process for accepting the selection of the composite image reproduction data. When execution is instructed, the composite image selection process 42 reads all the drawing device thumbnails from all the sets of the composite image reproduction data directly or subordinately stored in a predetermined folder of the external storage part 16, and shows the composite image selection screen 32. One of the thumbnail images 34 is double-clicked, and then the composite image selection process 42 accepts the selection of the thumbnail image 34, and outputs the file name of the association file specified by the thumbnail image 34 to the composite image reproduction process 44.

The component image manipulation process 43 is a process of accepting the selection of the component image files, and of accepting the designation of manipulations for the selected component image file to execute the specified manipulation for the selected component image file. When execution is instructed, the component image manipulation process 43 reads the component image files regarding all the sets of the composite image reproduction data directly or subordinately stored in a predetermined folder of the external storage part 16 and shows the component image selection screen 33. When one of the thumbnail images is right-clicked, the component image manipulation process 43 accepts the component image file specified by the thumbnail image as the selected component image file, and shows the pop-up menu 36. For example, when [Copy] is selected in the shown pop-up menu 36, the component image manipulation process 43 shows a dialog box, not shown in the drawing, for designating a file name or a folder to store it, and then stores a copy of the selected component image file in the specified folder by the specified file name. When [Store it in Work Memory] is selected, the component image manipulation process 43 stores the component image file in the area that is on the work memory 13 and shared by a plurality of programs, so-called a clipboard. When [Show Component Image] is selected, the process shows the component image represented by the component image file on the display part 15 in higher resolution than the thumbnail image.

The composite image reproduction process 44 is a process of reproducing the composite image based on a set of the composite image reproduction data. When the file name of the association file is outputted from the composite image selection process 42, the composite image reproduction process 44 shows a dialog box, not shown in the drawing, for designating the printing paper size. When the printing paper size is specified, the composite image reproduction process 44 combines the component image, represented by the component image file forming a set of the composite image reproduction data (which is specified by the association file designated by the outputted file name), based on the layout definition file (designated by the specified printing paper size), and generates the composite image. Subsequently, the composite image reproduction process 44 creates print data based on the generated composite image, and outputs it to the printer 2 for printing. Accordingly, the composite image reproduction process 44 reproduces the composite image. Moreover, it is acceptable if the composite image reproduction process 44 reproduces the generated composite image by showing it on the display part 15. In this case, the operation of the printer 2 is unnecessary.

Figure 7:
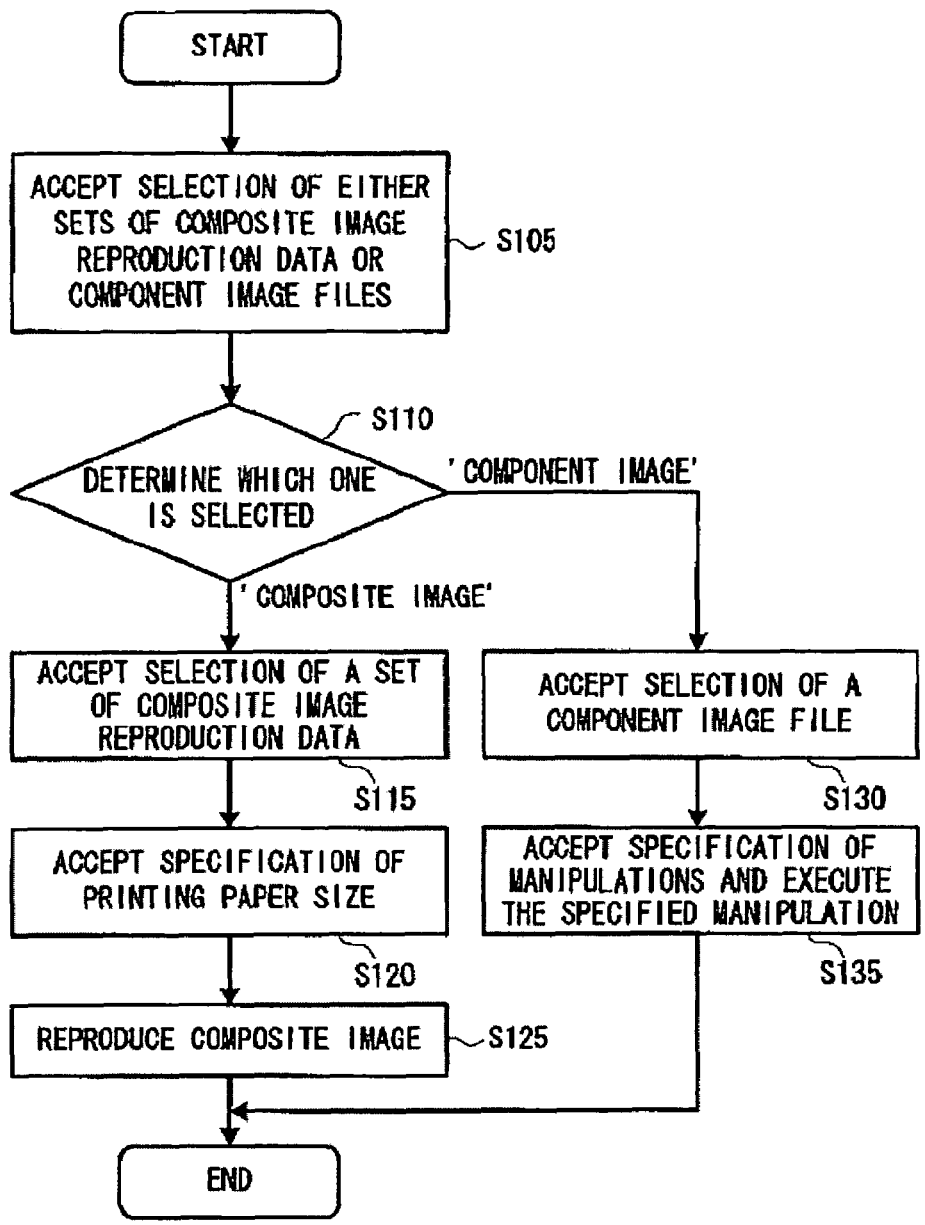
FIG. 7 is a flow chart illustrating the first embodiment according to the invention.

FIG. 7 is a flow chart illustrating the process flow of the image processing program.

In S105, the mode selection menu 31 is shown on the display part 15 to accept the selection of either the sets of the composite image reproduction data or the component image files forming the sets of the composite image reproduction data. The user selects [Composite Image] when the user wants to print the composite image, whereas the user selects [Component Image] when the user wants only to manipulate the component image file without printing the composite image.

In S110, the PC 1 determines which one is selected. Then, the process proceeds to S115 when [Composite Image] is selected, whereas it proceeds to S130 when [Component Image] is selected.

In S115, the PC 1 accepts the selection of one of the sets of the composite image reproduction data. In S120, the PC 1 accepts the designation of the printing paper size. In S125, the PC 1 reproduces the composite image based on the selected set of the composite image reproduction data and the specified printing paper size.

In S130, the PC 1 accepts the selection of one of the component image files. In S135, the PC 1 accepts the designation of manipulations for the selected component image file, and executes the specified manipulation for the selected component image file.

According to the first embodiment of the invention described above, the user can use PC 1 to select the third image selection mode in which the sets of the composite image reproduction data 34 are the selection objects, and can use PC 1 to select the fourth image selection mode in which the items of the component image data 35 forming the sets of the composite image reproduction data are the selection objects. Therefore, the user can select not only the sets of the composite image reproduction data but also the items of the component image data forming the sets of the composite image reproduction data as processing objects.

For example, suppose the user sees the thumbnail images of composite images shown on the composite image selection screen 32, and wants to use the component images forming one of the composite images for another purpose. In this case, the fourth image selection mode is selected by the PC 1, and then the items of the component image data thereof can be separately manipulated without additionally activating a general file operating program. Thus, the items of the component image data forming a set of the composite image reproduction data can also be used for another purpose. Furthermore, since all the component image files, each of which is associated with particular sets of composite image reproduction data, are shown on the component image selection screen 33, the user can avoid much searching or greatly reduce the amount of searching as compared with the case in which the user must normally repeatedly search through various folders. Moreover, only the component image designation information about the component image files forming the composite image is shown on the component image selection screen 33, and information about other irrelevant files is not shown. Therefore, the target component image file can easily be found from the files shown. In this manner, using the PC 1, since it can select the fourth image selection mode in which the component image data are the selection objects, the user can easily select a target item of the component image data from the component image data forming the composite image reproduction data. In addition, the PC 1 can execute the specified manipulation for the selected item of the component image data. Thus, the user can also easily use the items of the component image data, forming a set of the composite image reproduction data, for another purpose.

Furthermore, according to the first embodiment, since the component image files are read from a plurality of composite image reproduction files and are shown all at once on the component image selection screen 33, the user does not need to select the composite image reproduction files in selecting the component image files, and the operations to select the component image files are simplified.

Second Embodiment

A second embodiment is the exemplary operations of the PC 1 as an image processing apparatus for processing packaged component image files when one or more of component image files for reproducing a single composite image are stored in a single file, that is, they are packaged.

Figure 8:
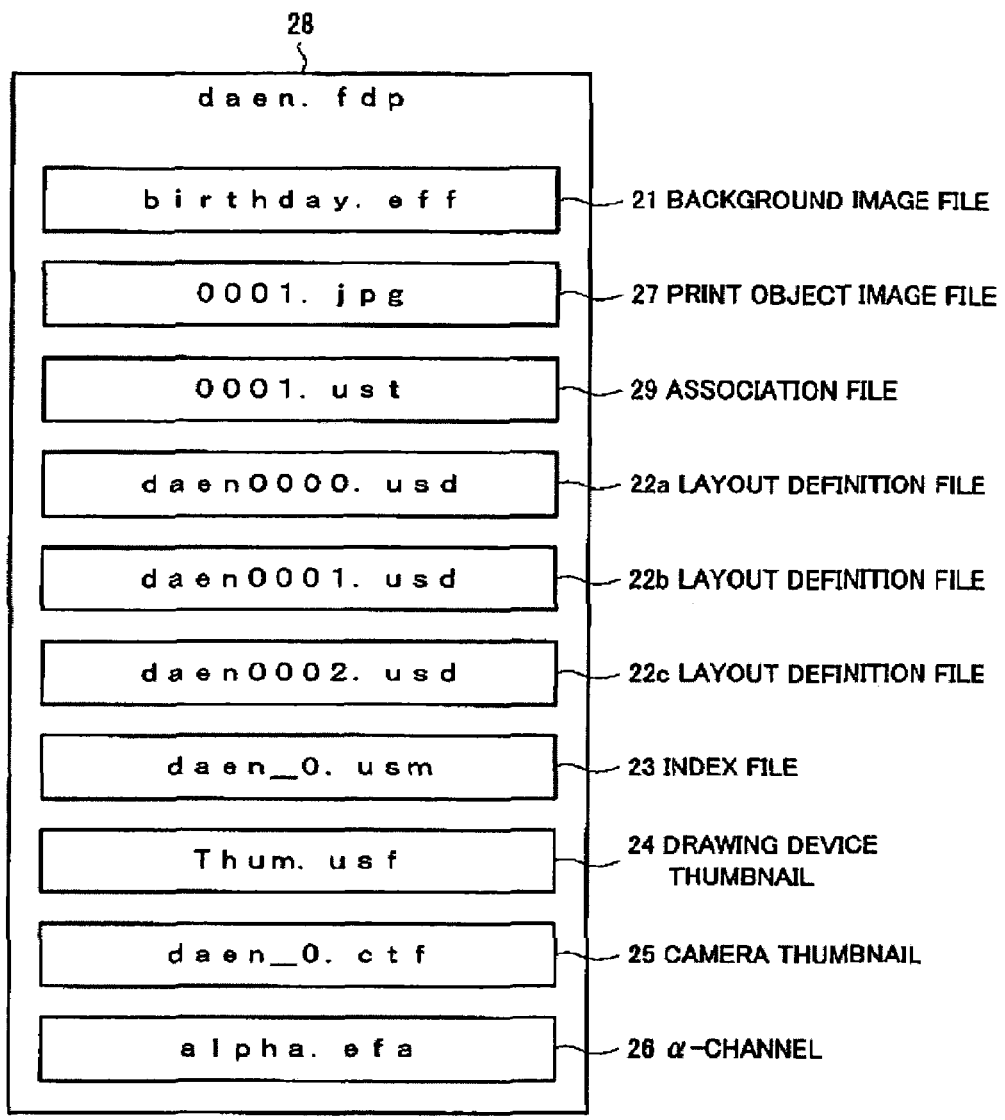
FIG. 8 is a schematic diagram illustrating a set of composite image reproduction data in a second embodiment according to the invention.

FIG. 8 is a schematic diagram illustrating a state that one or more of component image files for reproducing a single composite image are packaged in a single file (composite image reproduction file). A file 28 having the extension of '.fdp' is the composite image reproduction file. The composite image reproduction file 28 stores a background image file 21, a print object image file 27, an association file 29, a layout definition file 22a, a layout definition file 22b, a layout definition file 22c, an index file 23, a drawing device thumbnail 24, a camera thumbnail 25, and an α-channel 26. The background image file 21 and the print object image file 27 are equivalent to the component image files.

In the second embodiment, each of the thumbnail images 34 is associated with the file name of the composite image reproduction file in the composite image selection screen 32 described before. Therefore, when one of the thumbnail images 34 is selected, the PC 1 can uniquely specify the composite image reproduction file that stores the drawing device thumbnail representing the thumbnail image 34. Furthermore, when the composite image reproduction file does not store the drawing device thumbnail, it is acceptable if PC 1 shows the file names of the composite image reproduction files all at once, as composite image designation information.

In the second embodiment, the composite image selection process 42 described above accepts the selection of the composite image reproduction files. When execution is instructed, the composite image selection process 42 reads the drawing device thumbnails from all the composite image reproduction files directly or subordinately stored in a predetermined folder of the external storage part 16, and shows them on the composite image selection screen 32. When one of the thumbnail images 34 is double-clicked, the composite image selection process 42 accepts the selection of the thumbnail image 34, and outputs the file name of the composite image reproduction file specified by the thumbnail image 34 to the composite image reproduction process 44.

According to the second embodiment of the invention described above, one or more of the component image files for reproducing a single composite image are stored in a single file. Therefore, one or more of the component image files can be included in the composite image reproduction file, and the component image files can be manipulated separately, thus enhancing the portability of the component image files.

Third Embodiment

According to a third embodiment of the invention, the PC 1 as an image processing apparatus operates such that a group of items of component image data, forming a set of composite image reproduction data selected by the third image selection mode, become the selection objects in the fourth image selection mode. That is to say, the selection objects in the fourth image selection mode are determined based on the selection made in the third image selection mode.

Figure 9:
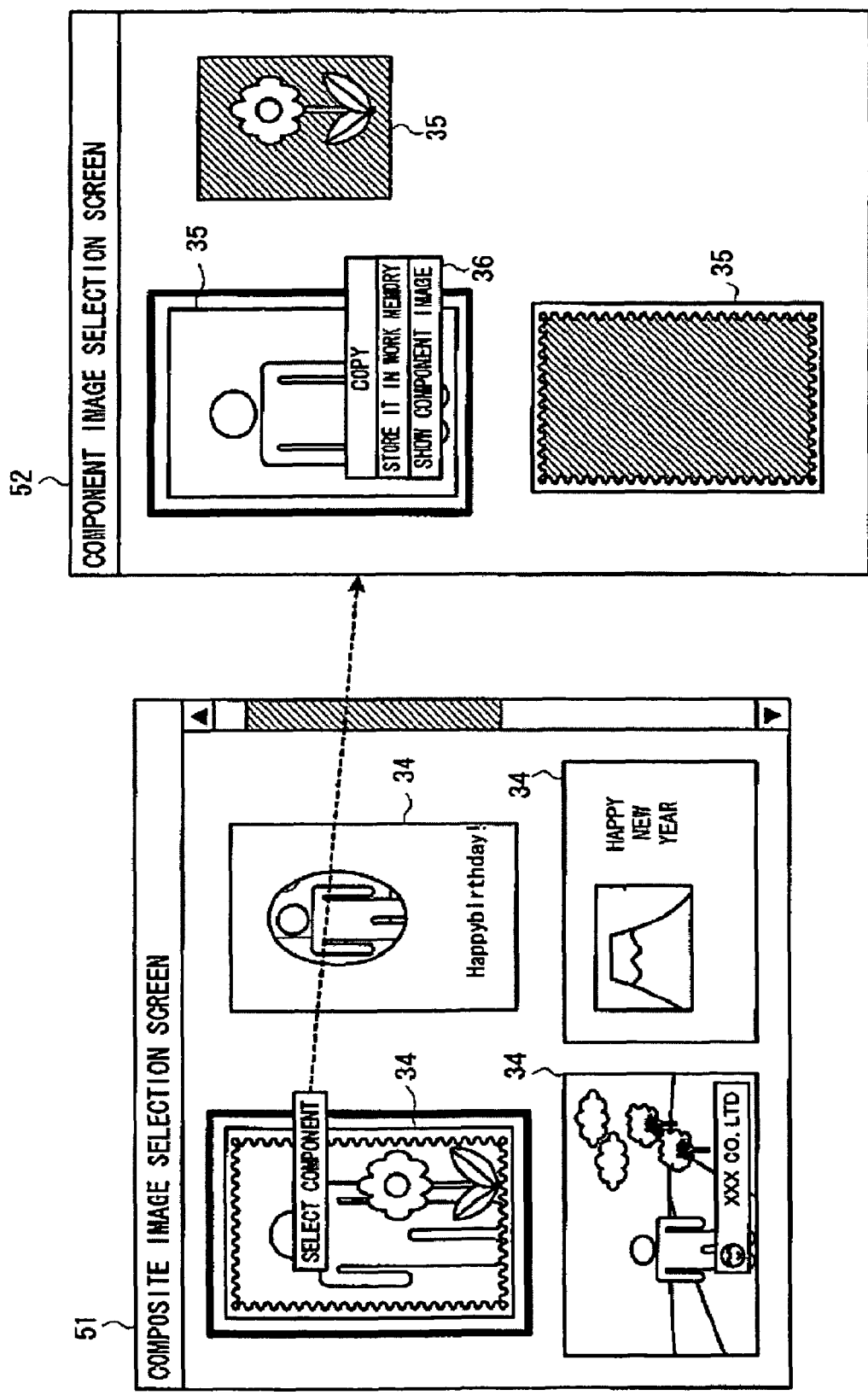
FIG. 9 is a schematic diagram illustrating screens in a third embodiment according to the invention.

FIG. 9 is a schematic diagram illustrating screens shown by an image processing program of the third embodiment. In the third embodiment, when the image processing program starts to be executed, the PC 1 first selects the third image selection mode to show a composite image selection screen 51. When one of thumbnail images 34 is right-clicked, a selection item of [Select Component] is shown as a pop-up menu 53 on the composite image selection screen 51. When a user selects [Select Component], the PC 1 selects the fourth image selection mode, and shows a component image selection screen 52. In addition, for example, it is acceptable that the fourth image selection mode is selected when the user double-clicks one of the thumbnail images 34. On the component image selection screen 52 of the third embodiment, only the thumbnail images of the component images are shown that are represented by the component image files forming the set of the composite image reproduction data specified by the thumbnail image 34 that has been right-clicked on the composite image selection screen 51.

According to the third embodiment described above, the flow is to first select one of the sets of the composite image reproduction data, and then to show component images based on the selection, and then to next select the items of the component image data forming the selected set of the composite image reproduction data. Here, since the selection proceeds hierarchically from a large unit (composite) to a small unit (component), the user easily can understand the operations. Moreover, according to the third embodiment, since the component image files of only the selected set of the composite image reproduction data are read, in showing the component image selection screen 52, the time required for reading the component image files can be shortened.

Fourth Embodiment

In a fourth embodiment according to the invention, PC 1 operates such that a user may specify either a first image selection mode such that a group of items of component image data having a given attribute are the selection objects, or a second image selection mode such that the selection objects are a group of items of component image data have an attribute different from that of the component image data selected by the first image selection mode. Here, data formats will be described as the exemplary attributes of the component image data. As described in the first embodiment, a set of the component image data has the print object image data having the extension of '.jpg', and the background image data having the extension of '.eff'. They are different in the data formats. The image processing apparatus of the fourth embodiment selects items of the print object image data in the first image selection mode, and selects items of the background image data in the second image selection mode.

Figure 10:
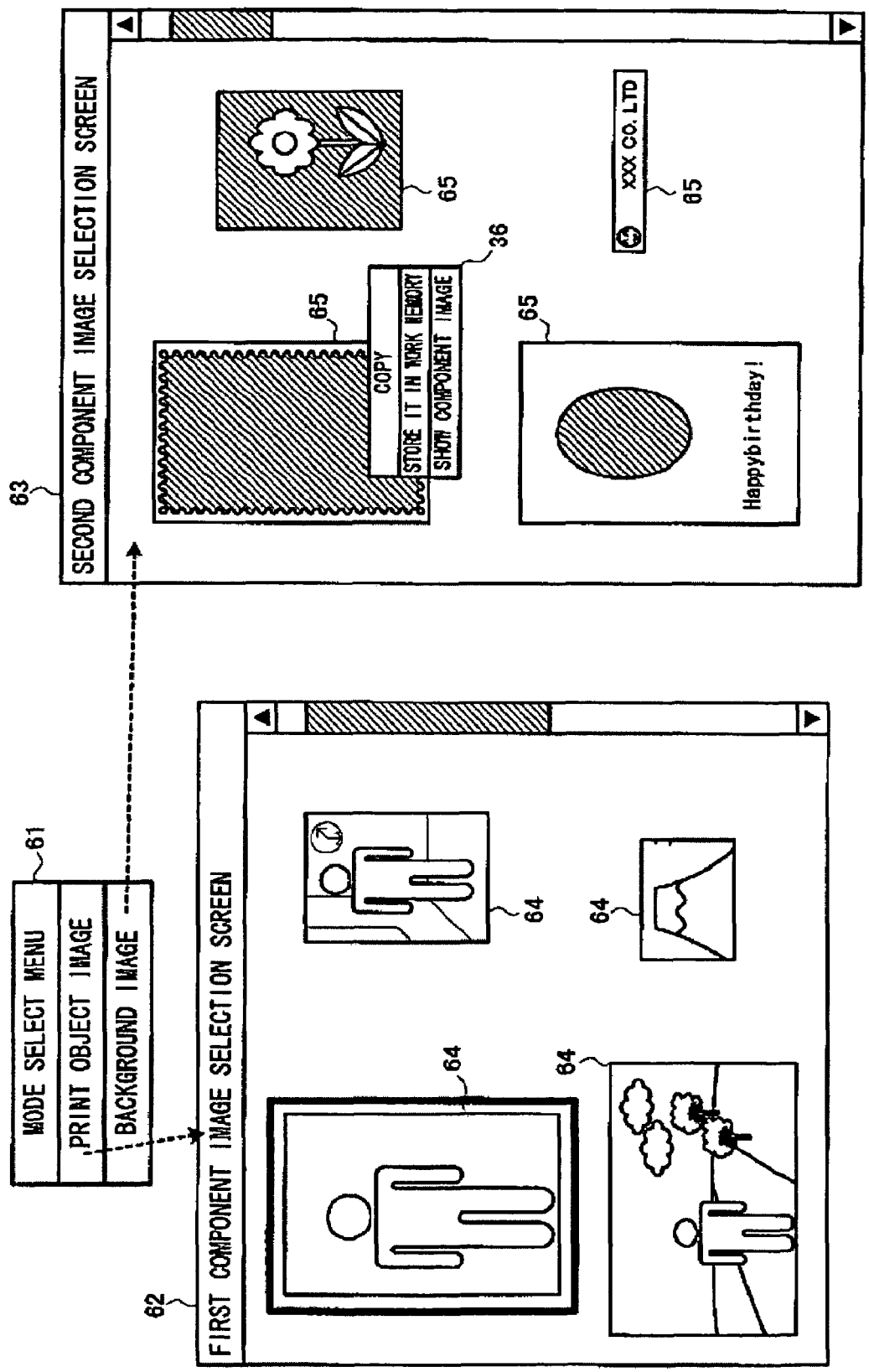
FIG. 10 is a schematic diagram illustrating screens in a fourth embodiment according to the invention.

FIG. 10 is a schematic diagram illustrating screens shown by an image processing program of the fourth embodiment. When the image processing program starts to be executed, a screen 61 for designating the first image selection mode or second image selection mode is shown. When 'Print Object Image' is specified, the first image selection mode is selected, and items of the component image data having the extension of 'jpg', that is, thumbnail images 64 represented by the items of the print object image data are shown all at once as selection objects, as shown in a first component image selection screen 62. When 'Background Image' is specified, the second image selection mode is selected, and items of the component image data having the extension of '.eff', that is, thumbnail images 65 represented by the items of the background image data are shown all at once as selection objects, as shown in a second component image selection screen 63. Component image designation information about the items of the print object image data is shown on the first component image selection screen 62. Only the items of the print object image data can be selected on the first component image selection screen 62. Furthermore, component image designation information about the items of the background image data is shown on the second component image selection screen 63. Only the items of the background image data can be selected on the second component image selection screen 63. Therefore, objects for selection are varied in the first image selection mode and the second image selection mode.

According to the fourth embodiment described above, when the first image selection mode is selected, the component image data other than the print object image data is not shown on the first component image selection screen 62. More specifically, only the items of the print object image data are the objects for selection in the first image selection mode. Suppose that, when a user wanted to select items of the print object image data, items of the background image data were shown. The items of the print object image data and the background image data would be mixed up, and the user would be confused as to which item is the print object image data and which is the background image data. Thus, it would be difficult to select the items of the print object image data. When the PC 1 shows only the items of the print object image data according to the present embodiment of the invention, however, the items of the component image data other than the print object image data are not shown. Therefore, according to this embodiment, the items of the print object image data can easily be selected. The same is true of the second image selection mode.

Moreover, in the fourth embodiment, the data formats are described as the exemplary attributes of the component image data, but it is acceptable if the attributes are not limited to the data formats. For example, it is acceptable if the PC 1 determines the attributes of the component image data in accordance with handling of the component image data in the layout definition file. For example, it is acceptable if the PC 1 handles the component image data so that the data being the background image and the data being foreground image are the attributes of the component image data when the component image data is separated into the background image data and the component image data in the layout definition file. What condition is to be the attribute of the component image is a design item that can be selected freely according to the perceived need of the user or situation.

Fifth Embodiment

According to a fifth embodiment of the invention, PC 1 is adapted to operate as an image processing apparatus in which a single set of component image data is formed of a plurality of items of component image data. In the fifth embodiment, the PC 1 selects a set of composite image reproduction data in the third image selection mode, and selects a set of component image data formed of a plurality of items of component image data in the fourth image selection mode.

Figure 11:
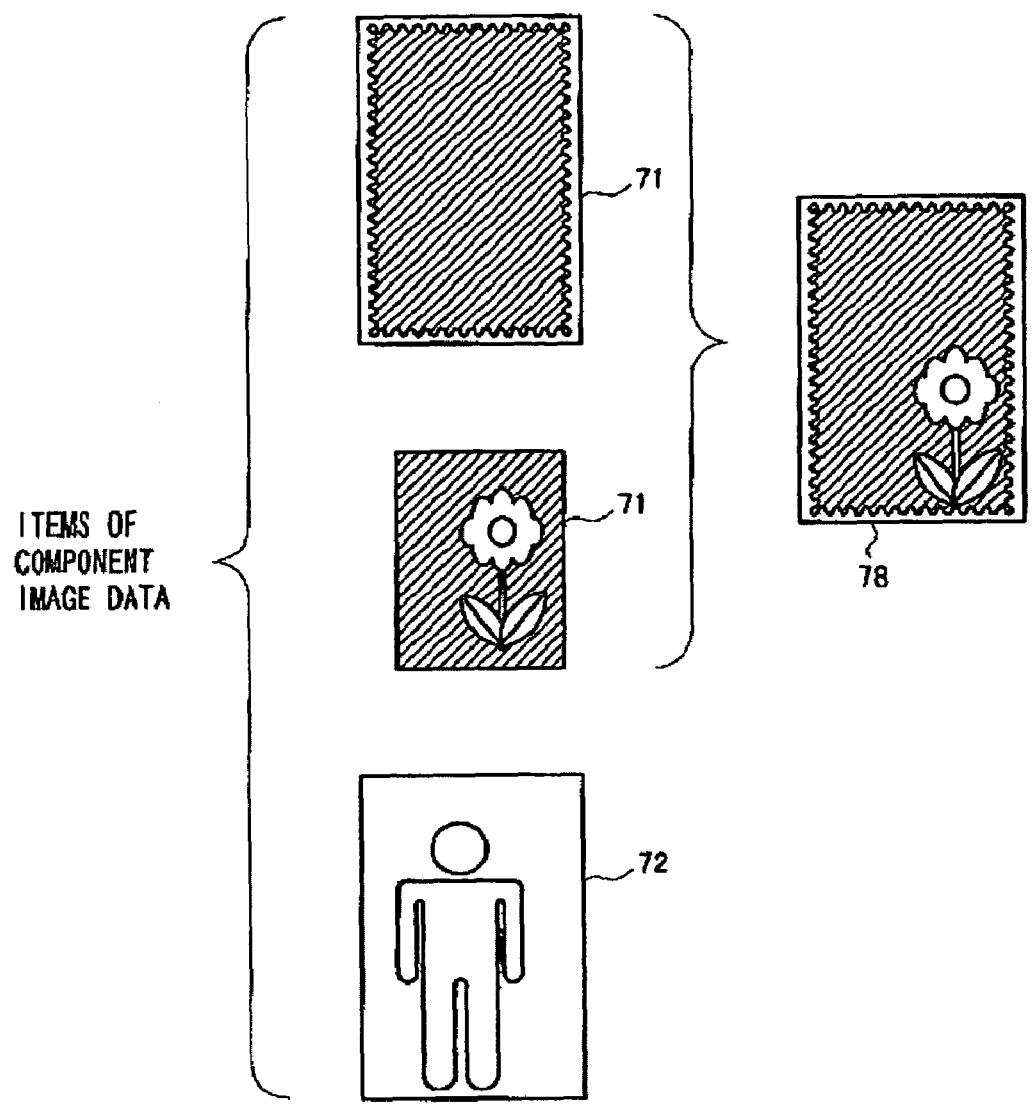
FIG. 11 is a schematic diagram illustrating items of component image data in a fifth embodiment according to the invention.

FIG. 11 is a schematic diagram illustrating a set of component image data formed of a plurality of items of component image data. More specifically, a plurality of the items of the component image data forming a single set of the component image data is equivalent to a plurality of items of component image data, that is, the remaining items of component image data including items of background image data 71 but not print object image data 72. In the description below, the plurality of the items of the background image data 71 is called a set of frame image data. The image 78 in the drawing depicts a frame image generated based on a set of the frame image data.

Figure 12:
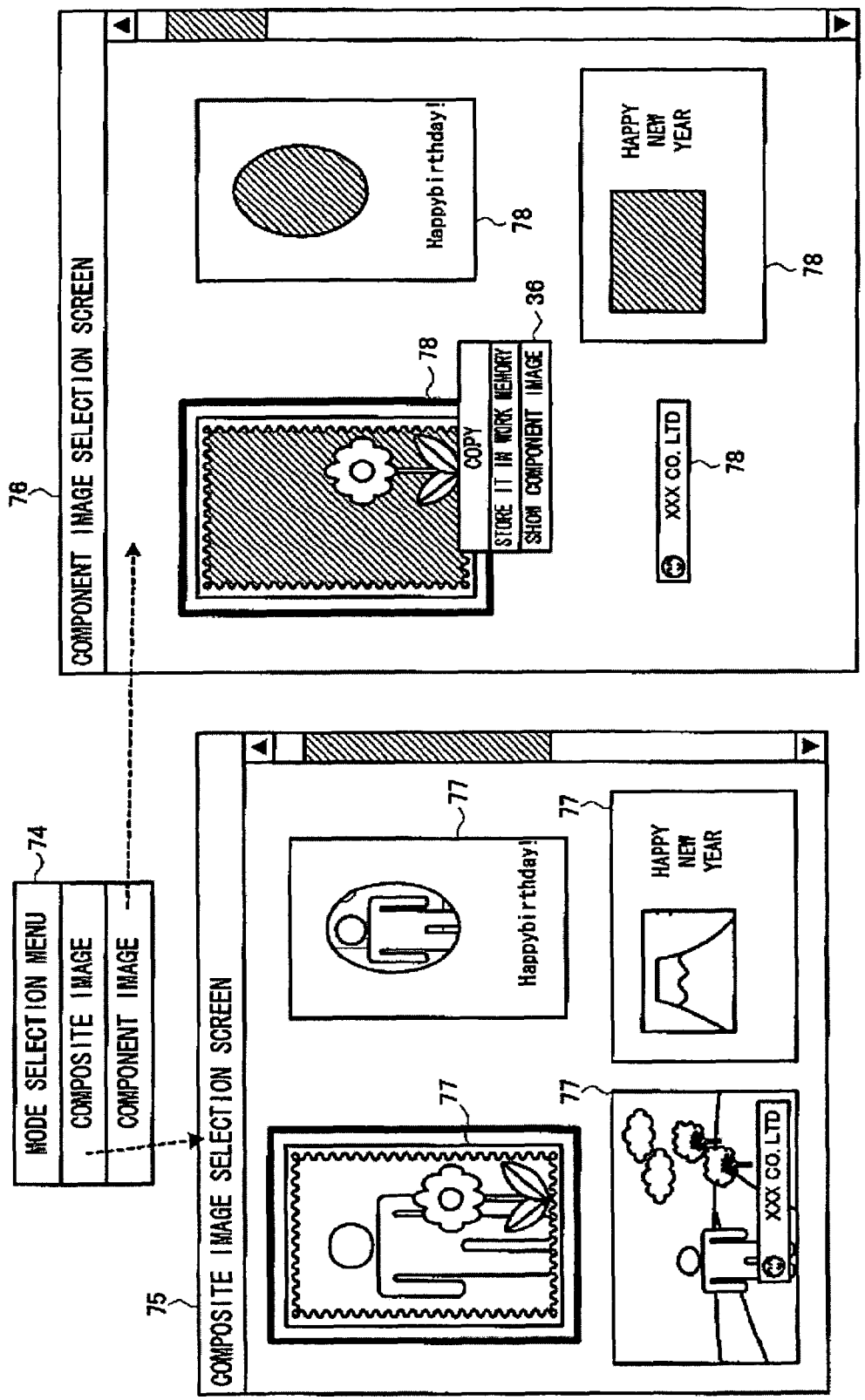
FIG. 12 is a schematic diagram illustrating screens in the fifth embodiment according to the invention.

FIG. 12 is a schematic diagram illustrating screens shown by an image processing program of the fifth embodiment. When the image processing program starts to be executed, a screen 74 for designating the third image selection mode or fourth image selection mode is shown. When 'Composite Image' is specified, the third image selection mode is selected, and thumbnail images 77 of composite images generated based on sets of composite image reproduction data are shown all at once as selection objects, as shown in a composite image selection screen 75. When 'Component Image' is specified, the fourth image selection mode is selected, and thumbnail images 78 of frame images generated based on sets of the frame image data are shown all at once as selection objects, as shown on a component image selection screen 76.

According to the fifth embodiment described above, a plurality of the items of the background image data can be handled integrally as a set of the frame image data in the fourth image selection mode. The frame image data is generated with the intention of being combined with unspecified print object image data; it is not generated with the intention of being combined with particular print object image data. Therefore, when a set of the frame image data is allowed to be handled as a single selection object, the set of the frame image data can be copied and combined with other items of print object image data, and then the frame image data can be widely used. For example, when a set of composite image reproduction data is distributed, a user selects and copies a set of frame image data forming the set of the composite image reproduction data in the fourth image selection mode, and can also use the set of the frame image data to combine with other items of print object image data for another purpose.

Sixth Embodiment

According to a sixth embodiment of the invention, the PC 1 is adapted to operate as an image processing apparatus in which a set of the frame image data is handled as a single set of composite image reproduction data. As described in the fifth embodiment, a set of the frame image data is formed of a plurality of items of the background image data. When a plurality of items of the background image data exists, a set of the frame image data is also equivalent to a single set of composite image reproduction data. However, since the frame image data is not associated with print object image data, no image is shown in the area where a print object image is to be combined when a composite image is reproduced based on the frame image data.

Figure 13:
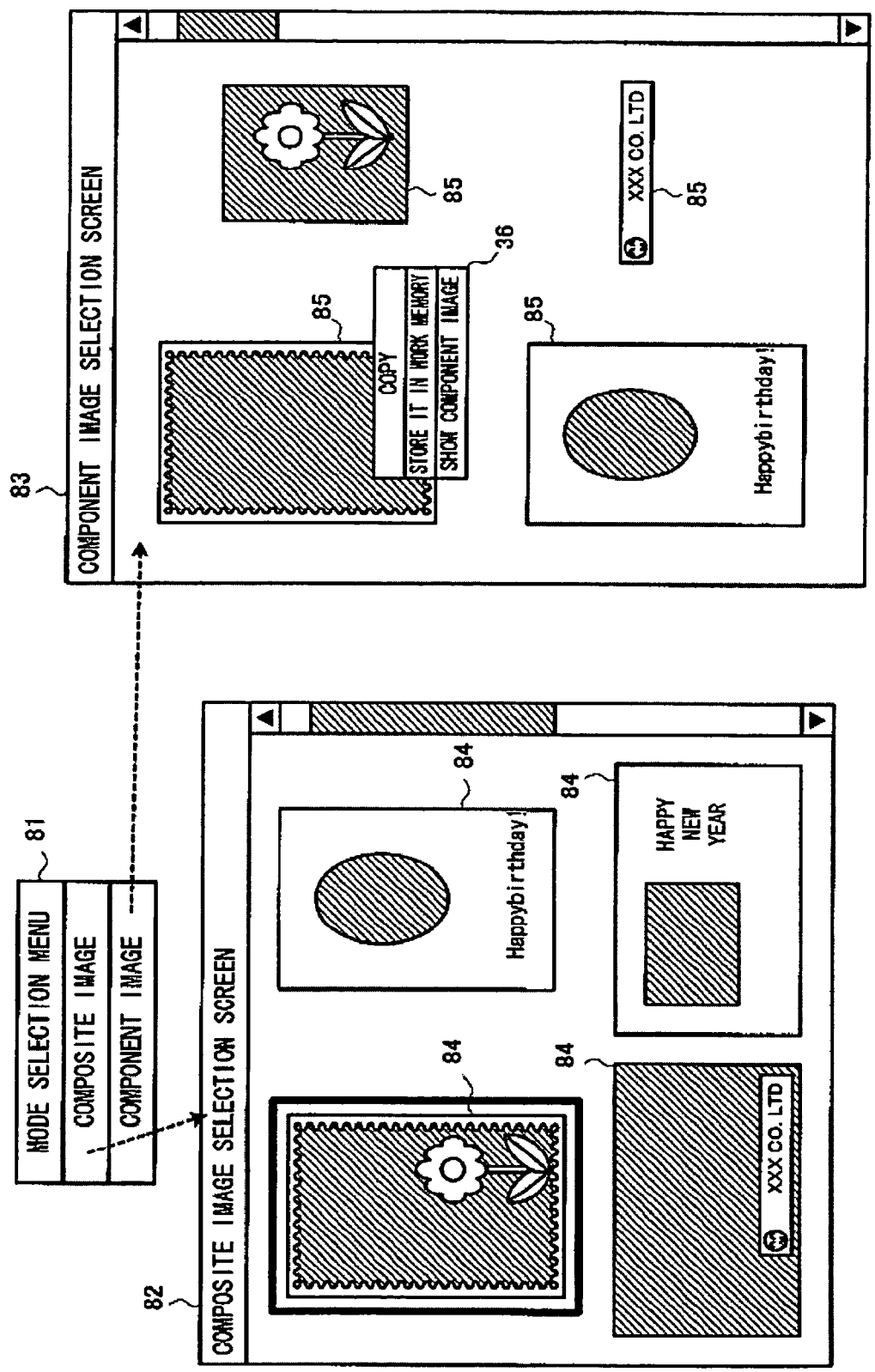
FIG. 13 is a schematic diagram illustrating screens in a sixth embodiment according to the invention.

FIG. 13 is a schematic diagram illustrating screens shown by an image processing program of the sixth embodiment. When the image processing program starts to be executed, a screen 81 is shown for user designation of the third image selection mode or fourth image selection mode. When 'Composite Image' is specified, the third image selection mode is selected, and thumbnail images 84 of frame images generated based on sets of frame image data are shown as selection objects, as shown on a composite image selection screen 82. When 'Component Image' is specified, the fourth image selection mode is selected, and thumbnail images 85 of background images represented by items of background image data are shown as selection objects, as shown on a component image selection screen 83.

According to the sixth embodiment described above, since one of the sets of the frame image data can be selected in the third image selection mode, a user can instruct the PC 1 to show or print only the set of the frame image data that is yet not combined with items of print object image data. Furthermore, since the items of the background image data forming a set of the frame image data can be selected in the fourth image selection mode, the items of the background image data forming the set of the frame image data, for example, can also be used for another purpose.

Seventh Embodiment

Figure 14:
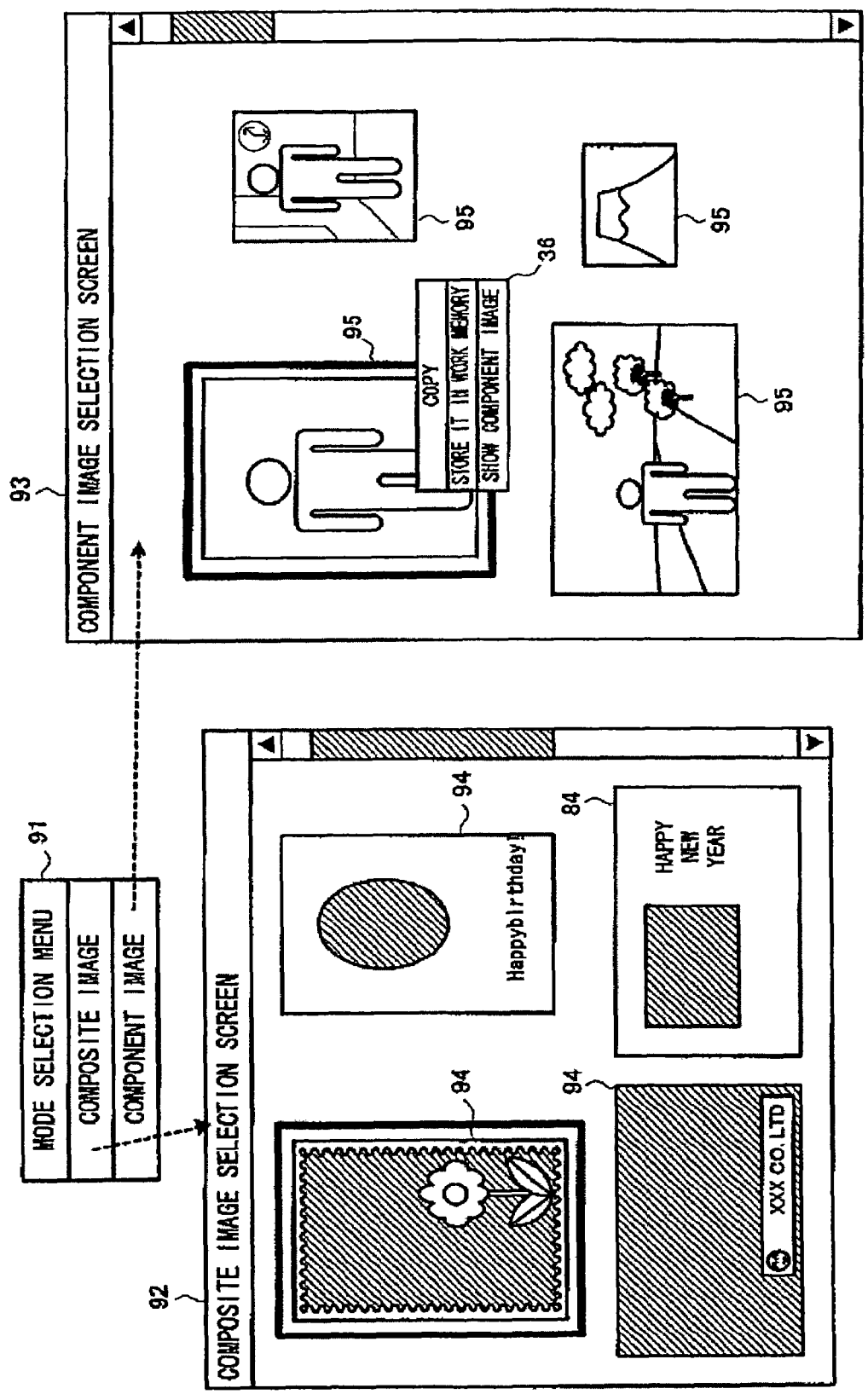
FIG. 14 is a schematic diagram illustrating screens in a seventh embodiment according to the invention.

A seventh embodiment of the invention is the exemplary operation of the PC 1 as an image processing apparatus in which sets of frame image data are selected as sets of composite image reproduction data in the third image selection mode, and items of print object image data are selected as items of component image data in the fourth image selection mode. FIG. 14 is a schematic diagram illustrating screens shown by an image processing program of the seventh embodiment. When the image processing program starts to be executed, a screen 91 for designating the third image selection mode or fourth image selection mode is shown. When 'Composite Image' is specified, the third image selection mode is selected, and thumbnail images 94 of frame images generated based on sets of frame image data are shown as selection objects, as shown on a composite image selection screen 92. When 'Component Image' is specified, the fourth image selection mode is selected, and thumbnail images 95 represented by items of print object image data are shown as selection objects, as shown on a component image selection screen 93. When one of the thumbnail images 94 of the frame image is selected in the third image selection mode, a process is executed that information for designating the corresponding set of the frame image data is stored in the work memory 13. When one of the thumbnail images 95 of the print object image is selected in the fourth image selection mode, a process is executed that the set of the frame image data specified by the information stored in the work memory 13 is combined with the item of the print object image data corresponding to the selected thumbnail image 95 for reproduction.

According to the seventh embodiment described above, a user can also easily use the frame image data and the print object image data for another purpose. Furthermore, as described before, it is acceptable if the PC 1 is allowed to execute the operation, such as copying, specified by the user for the selected thumbnail images 94 and 95.

Many variations to the above-identified embodiments are possible without departing from the scope and spirit of the invention. Possible variations have been presented throughout the foregoing discussion. Moreover, it will be appreciated that, in the embodiments described above, cases have been described in which either the first image selection mode or second image selection mode is selected and either the third image selection mode or fourth image selection mode is selected, but it is acceptable if the image selection modes are three or more. For example, it is acceptable to select any one of the above-identified modes: a mode such that the composite image reproduction data are the selection objects, a mode such that the component image data having a given attribute are the selection objects, and a mode such that the component image data having another attribute are the selection objects.

Combinations and subcombinations of the various embodiments described above will occur to those familiar with this field, without departing from the scope and spirit of the invention.

What is claimed is:

1. An image processing apparatus, comprising:
a mode selecting unit for selecting any one of a plurality of image selection modes including a first mode for selecting composite image reproduction data formed of a plurality of layers of component image data as a first object, and a second mode for selecting a layer of the plurality of layers of the component image data from the composite image reproduction data as a second object;
an image selecting unit for selecting any one of the first and second objects in accordance with one of the plurality of the image selection modes selected by the mode selecting unit; and
a processing unit for executing a predetermined process for one of the first and second objects selected by the image selecting unit,
wherein the composite image reproduction data is displayed on a display by composing the plurality of layers of the component image data without a user intervention after selection of the first mode,
wherein each of the plurality of layers of the component image data is displayed on the display by being split from the composite image reproduction data without a user intervention after selection of the second mode,
wherein the composite image reproduction data is formed of the plurality of layers of the component image data having different attributes,
wherein the mode selecting unit further selects one of:

a third mode wherein objects for selection are layers of the component image data having a given attribute, and a fourth mode wherein objects for selection are layers of the component image data having an attribute different from that of the layers of the component image data selected by the third mode, wherein the layers of the component image data for the selection in the third mode or the fourth mode does not include any image component which is not a part of the composite image reproduction data, and wherein each of the layers of the component image data is displayed in a different display frame respectively in the second mode.

2. A computer readable medium having recorded thereon a program for executing a method comprising:

a mode selecting step of selecting any one of a plurality of image selection modes including a first mode for selecting composite image reproduction data formed of a plurality of layers of component image data as a first object, and a second mode for selecting a layer of the plurality of layers of the component image data from the composite image reproduction data as a second object;

an image selecting step of selecting any one of the first and second objects in accordance with one of the plurality of the image selection modes selected in the mode selecting step; and a processing step of executing a predetermined process for one of the first and second objects selected in the image selecting step, wherein the composite image reproduction data is displayed on a display by composing the plurality of layers of the component image data without a user intervention after selection of the first mode, and wherein each of the plurality of layers of the component image data is displayed on the display by being split from the composite image reproduction data without a user intervention after selection of the second mode, wherein the composite image reproduction data is formed of the plurality of layers of the component image data having different attributes, wherein the mode selecting unit further selects one of:

a third mode wherein objects for selection are layers of the component image data having a given attribute, and a fourth mode wherein objects for selection are layers of the component image data having an attribute different from that of the layers of the component image data selected by the third mode, wherein the layers of the component image data for the selection in the third mode or the fourth mode does not include any image component which is not a part of the composite image reproduction data, and wherein each of the layers of the component image data is displayed in a different display frame respectively in the second mode.

* * * * *